(No Model.) 3 Sheets—Sheet 2.
F. F. SHANKS.
PLANTER.
No. 431,288. Patented July 1, 1890.
*Fig. 3.*
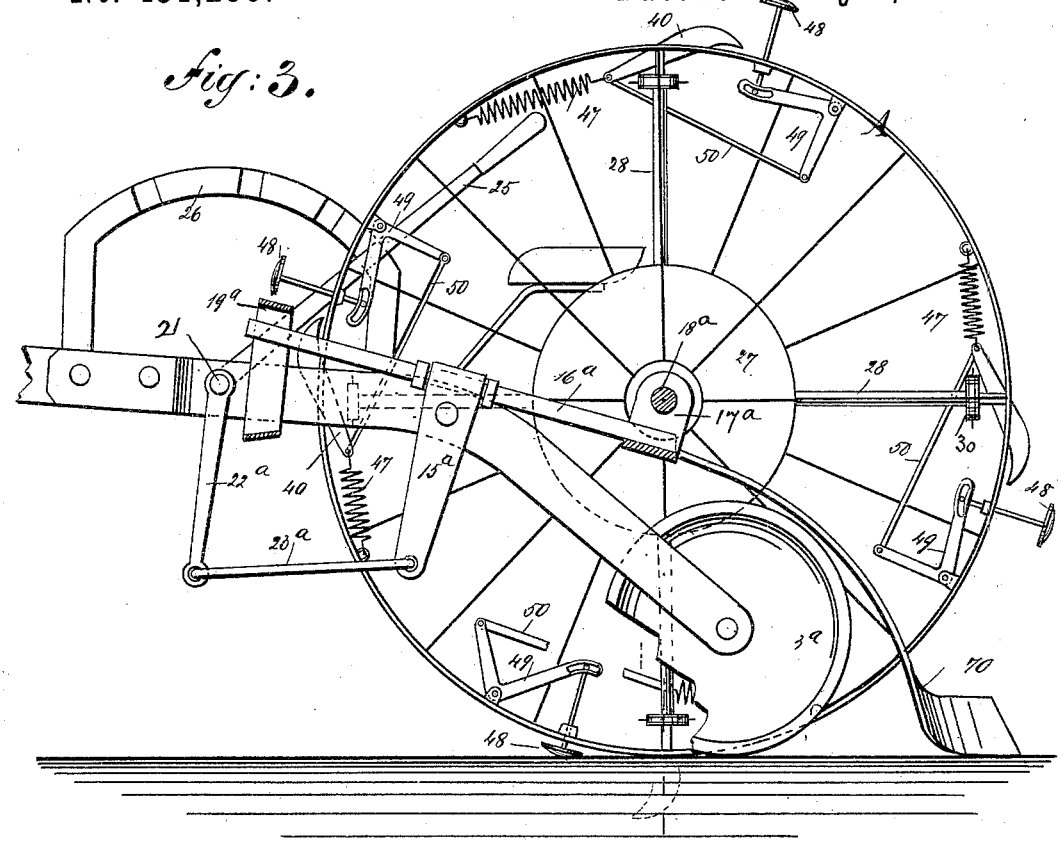
*Fig. 5.* *Fig. 4.* *Fig. 6.*
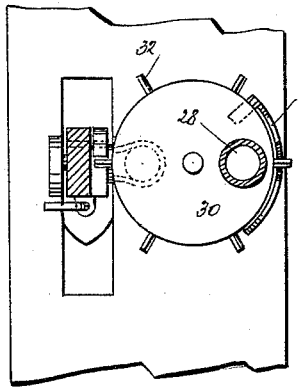
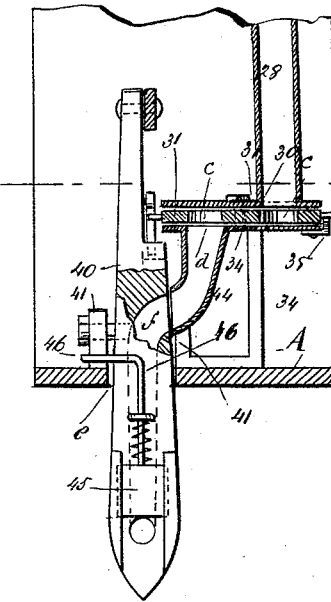
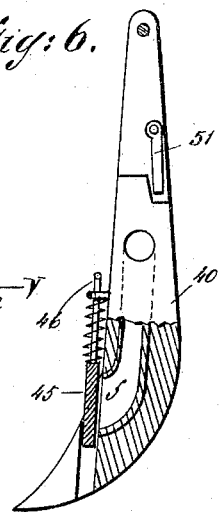
WITNESSES:
Chas. Nida
C. Sedgwick
INVENTOR:
F. F. Shanks
BY
Munn & Co.
ATTORNEYS.

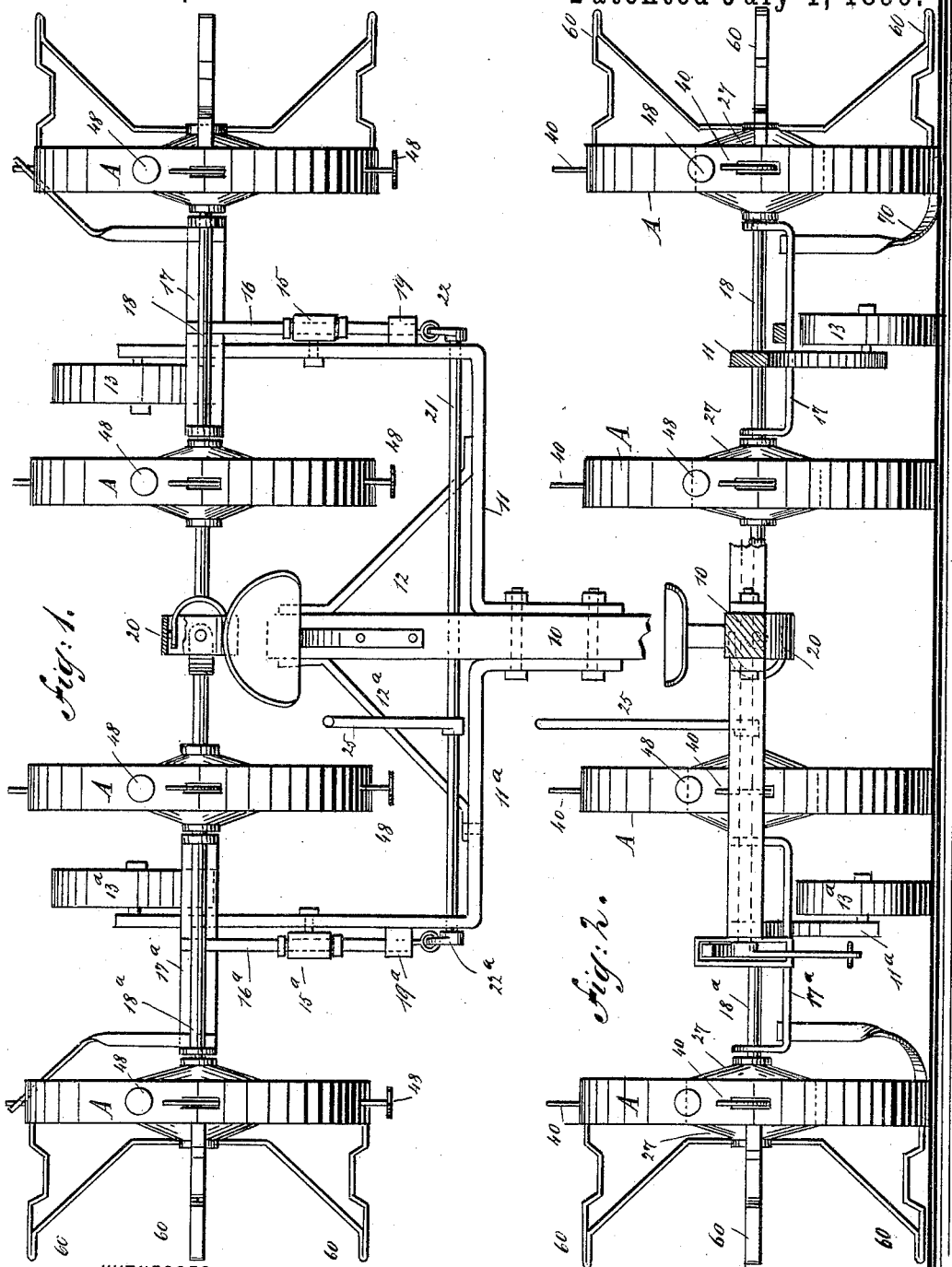

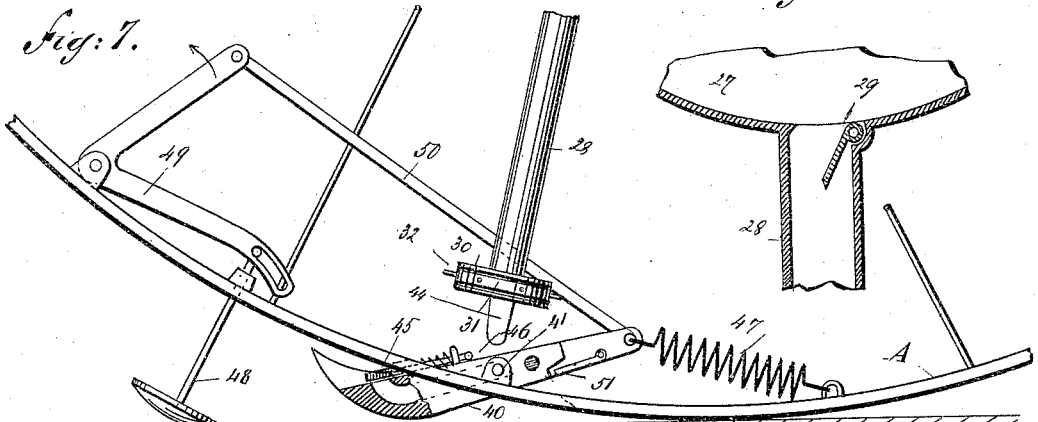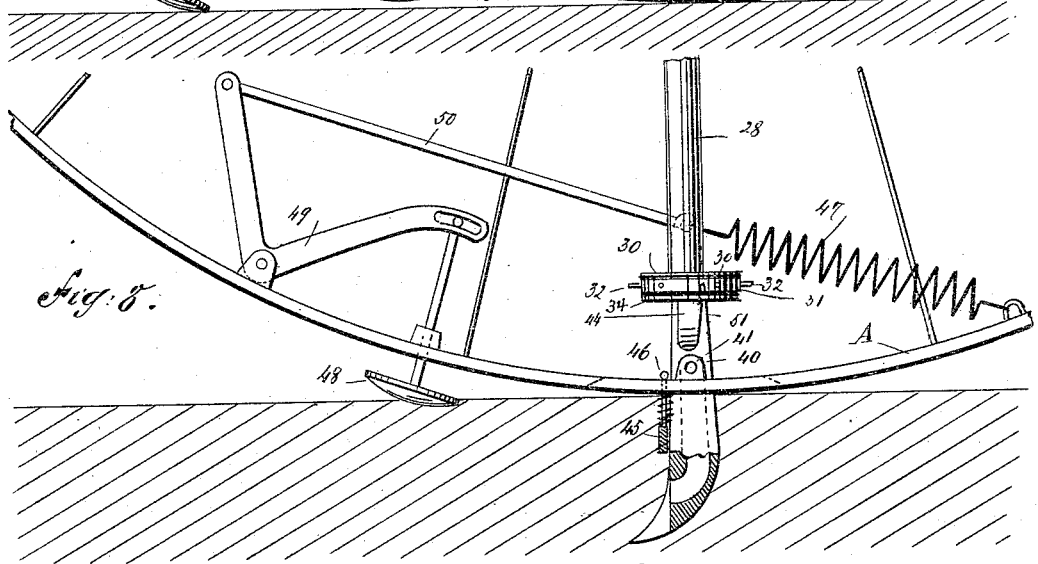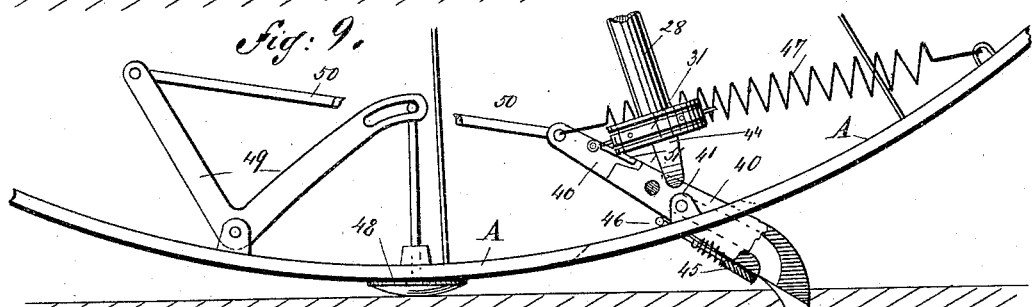

UNITED STATES PATENT OFFICE.

FRANK F. SHANKS, OF LA CYGNE, KANSAS.

PLANTER.

SPECIFICATION forming part of Letters Patent No. 431,288, dated July 1, 1890.

Application filed May 24, 1889. Serial No. 311,935. (No model.)

*To all whom it may concern:*

Be it known that I, FRANK F. SHANKS, of La Cygne, in the county of Linn and State of Kansas, have invented a new and Improved Planter, of which the following is a full, clear, and exact description.

This invention relates to planters, the object of the invention being to provide a planter which will deposit a certain required number of grains at stated intervals in ground that has not been prepared by plowing; and to the end named the invention consists, essentially, of a planter-wheel provided with hill-openers arranged to be thrown beyond the peripheral face of the said wheel, all as will be hereinafter fully described, and specifically pointed out in the claims.

Reference is to be had to the accompanying drawings, forming a part of this specification, in which similar figures and letters of reference indicate corresponding parts in all the views.

Figure 1 is a plan view of a planter embodying my invention. Fig. 2 is a front view thereof in partial section, parts being broken away. Fig. 3 is an enlarged cross-sectional view of the planter. Figure 4 is a still further enlarged detail view of a portion of one of the planter-wheels and of one of the hill-openers, parts being shown in section. Fig. 5 is a sectional plan view on line $v\ v$ of Fig. 4. Fig. 6 is a sectional detail view of the hill-opener. Fig. 7 is a detail view of a portion of one of the planter-wheels, the parts being represented as they appear prior to the opening of the slide in the hill-opener. Fig. 8 is a similar view, the parts, however, being represented as they appear after the wheel has slightly advanced and the hill-opener is in its lowest position, the slide of the opener being raised. Fig. 9 is a similar view representing the parts as they appear after the wheel has moved still farther onward, and Fig. 10 is a still further enlarged view of a portion of one of the seed drums or hoppers and of one of the seed-delivery tubes.

In the drawings, 10 represents the pole, to which there are rigidly-connected laterally-extending frames 11 and $11^a$, such frames being properly braced, preferably by diagonal braces 12 and $12^a$. The frames 11 and $11^a$ carry wheels 13 and $13^a$, which, when the planter is to be moved from place to place, rest upon the ground. To the frames 11 and $11^a$, I pivotally connect heavy supporting-levers 15 and $15^a$, and to the upper ends of these levers I connect rods 16 and $16^a$, which carry brackets 17 and $17^a$, that serve as supports for shafts 18 and $18^a$, said shafts 18 and $18^a$ being centrally connected by a universal joint 20. Upon the shafts 18 and $18^a$, I mount planter-wheels A, two of said wheels being mounted upon each shaft. The forward ends of the rods 16 and $16^a$ ride in guideways 19 and $19^a$, that are carried by the frames 11 and $11^a$, and in advance of said guideways I mount an operating-shaft 21, which is formed with downwardly-extending lever-arms 22 and $22^a$, that are connected by links 23 and $23^a$ with the lower ends of the levers 15 and $15^a$. The shaft 21 is provided with a lever-arm or handle 25, arranged in a position such that it may be thrown into engagement with a segmental rack 26, carried by the frame $11^a$.

From the construction above described it will be seen that if the lever 25 be thrown forward the levers 15 and $15^a$ will be rocked in a manner such that the shafts 18 and $18^a$ will be raised, and in practice I would so proportion the parts that by throwing the lever 25 forward and bringing it into engagement with the rack 26 it would carry the wheels A some distance above the ground.

The hubs 27 of the wheels A are hollow, and to each hub I connect four radially-extending tubes 28, at the upper ends of which tubes there are arranged valves 29, while to the lower ends of the tubes I connect disks 30, the said disks extending eccentrically from the tube. To the axes of the disks 30, I connect disks 31, that are formed with radially-extending studs or pins 32 and with apertures $c$, and beneath the disks 31 there are mounted disks 34, which carry a spring 35, arranged to engage the studs or pins 32 and hold the disk 31 in position. The disk 34 is formed with an aperture $d$.

In order that the seed may be delivered to the ground beneath the surface, I provide a hill-opener 40, which said opener is pivotally supported upon brackets 41, carried by the wheel-fellies, the hill-opener being arranged to extend through a slot $e$, that is formed in the felly. This hill-opener is of novel construction, and consists of a shovel-like body, in which there is formed a bore $f$, which at times communicates with a funnel-like projection 44, that extends downward from the disk 34, the discharge-opening of the bore $f$ being normally closed by a slide 45, formed with an upwardly-extending stem 46, that overlaps the inner face of the felly.

The hill-opener is normally held, as represented in Fig. 7, by a spring 47; but in order that the opener may be moved against the tension of the spring to the position in which it is shown in Fig. 8, I provide a presser-foot 48, the stem of which is connected to a bell-crank lever 49, which said lever is in turn connected to the opener by a rod or link 50, and as the presser-foot is arranged in advance of the hill-opener it will be seen that when the foot bears upon the ground and is forced toward the peripheral face of the wheel the lever 49 will be rocked, as indicated by the arrow shown in Fig. 7, and the opener will be drawn to the position in which it is shown in Fig. 8, and as the opener is so drawn the stem of its slide 45 will bear against the inner face of the felly and the bore $f$ will be opened.

As the machine constructed as above described is drawn forward, the grain is delivered from the seed boxes or hoppers 27 to the tubes 28 when such tubes reach a position beneath the boxes, and from the tubes 28 the grain passes downward to the disk 31, any return of the grain to the hopper being prevented by the valve 29. After the grain has passed within one of the recesses $c$, the opener 40 being in the position in which it is shown in Fig. 7, the upward movement of the presser-foot 48, arranged in connection with the opener, will bring said opener first to the position in which it is shown in Fig. 8, and finally to the position in which it is shown in Fig. 9. After the wheel A moves beyond the position in which it is shown in Fig. 9, the spring 47 will act to throw the presser-foot outward, and the opener 40 will be returned by said spring to the position in which it is shown in Fig. 7, the latch 51 at this time engaging one of the pins 32, and the disk 31 will be advanced until the contents of one of the apertures $c$ is discharged into the funnel-like attachment 44.

The outer wheels A may, if desired, be provided with markers 60. The object of connecting the shafts 18 and 18$^a$ by a universal joint is to provide for the proper operation of the machine irrespective of the contour of the ground. If desired, closing-shovels 70 might be arranged as shown in the drawings.

Having thus described my invention, I claim as new and desire to secure by Letters Patent—

1. In a planter, the combination, with a supporting-frame carrying wheels on its rear end, of levers pivoted to the frame, rods secured to the upper ends of the said levers, planter-wheels carried by the rear ends of the said rods, guideways in which the forward ends of the rods ride, a shaft journaled in the frame and provided with an operating-handle, and connection between the shaft and levers pivoted to the frame, substantially as described.

2. In a planter, the combination, with a wheel having a central seed-box, of a hill-opener carried by the wheel and having a passage-way through it, a tube leading from the seed-box, a seed-disk at the lower end of the tube, and a spout for conducting the seed from the disk to the hill-opener, substantially as herein shown and described.

3. In a seed-planter, the combination, with a wheel having a central seed-box, of a pivoted and spring-held hill-opener carried by the wheel and having a passage through it, a valve for closing the lower end of the passage in the hill-opener and adapted to be operated by the felly of the wheel, a tube leading from the seed-box, a seed-disk at the lower end of the tube, a spout for conducting the seed from the disk to the hill-opener, a presser-foot, and connections between said foot and hill-opener, substantially as herein shown and described.

4. In a planter, the combination, with a wheel having a central seed-box and provided with a spout leading from the seed-box, of a seed-disk at the lower end of the said spout provided with projecting pins, a pivoted hill-opener having a passage through it, a spout for conducting the seed from the disk to the hill-opener, a latch carried by the hill-opener and adapted to engage the pins of the seed-disk, and means for operating the hill-opener by the forward movement of the planter, substantially as herein shown and described.

5. In a planter, the combination, with a wheel having a central seed box or hopper, of tubes leading outward from said seed box or hopper, hill openers, springs arranged in connection with said openers, a funnel-like attachment leading to the openers, a presser-foot, a bell-crank lever to which the presser-foot is connected, connections between the bell-crank lever and the hill-openers, a revoluble disk formed with apertures $c$, and arranged in connection with the tubes which lead outward from the seed-box, and latches carried by the hill-openers, substantially as described.

6. In a planter, the combination, with a wheel, of a hill-opener, a bell-crank lever connected to the opener, a presser-foot connected to the bell-crank lever, a gate or valve provided with an upwardly-extending stem carried by the opener, a funnel-like attachment 44, a disk 34, formed with an aperture $d$, with which the funnel-like attachment registers, an apertured disk 31, having projections 32, a latch 51, carried by the opener, a tube 28, and a central hopper 27, substantially as described.

FRANK F. SHANKS.

Witnesses:
J. P. KEMO,
J. W. MITCHELL.